Jan. 19, 1971  C. K. MOUSEL  3,555,583
TIRE TOOL
Filed Feb. 13, 1968
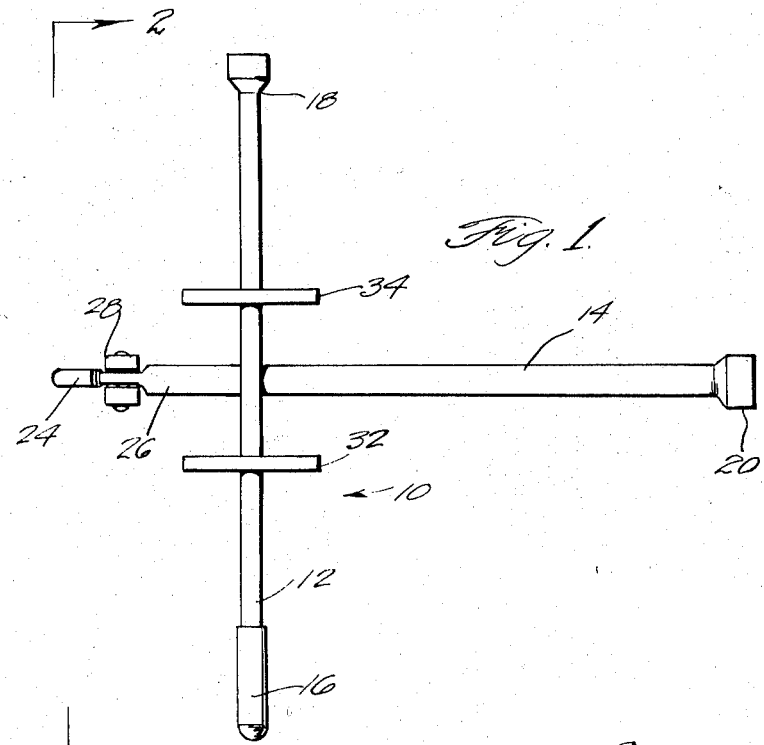
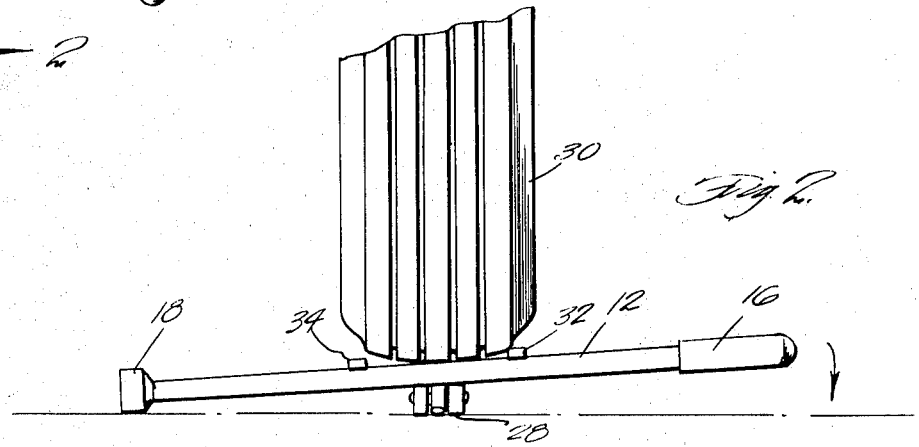
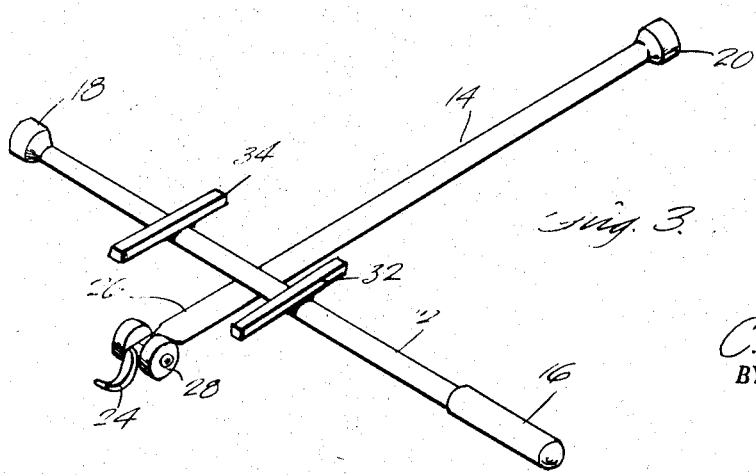
INVENTOR.
C. K. MOUSEL
BY
Victor J. Evans & Co.
ATTORNEYS United States Patent Office 3,555,583
Patented Jan. 19, 1971

3,555,583
TIRE TOOL
Canellen K. Mousel, Edison, Nebr. 68936
Filed Feb. 13, 1968, Ser. No. 705,082
Int. Cl. B25f *1/00;* B60c *25/00*
U.S. Cl. 7—1
1 Claim

ABSTRACT OF THE DISCLOSURE

A tire tool comprising a cross arrangement of two perpendicularly disposed components used as a handle and turning arms, as well as a wrench, respectively; small lengths of crosspieces arranged along one of the components and parallel to each other and symmetrically disposed about the other component, for supporting a tire when being mounted upon a wheel base of an automobile, and a skid and hook element for sliding in skidding relation along the ground or into the slot between the hub cap and the wheel, including a hook element to pull the hub cap from the wheel. The device also includes a pair of roller wheels mounted near the skid-hook element for sliding the tire into engagement with the mounting wheel or rim of the automobile.

The present invention relates to a tire tool having cross bars, a hook and skid means for sliding under a portion of the hub cap for removal thereof, and for providing roller wheels mounted adjacent the skid member to transport a tire when supported by the tire tool.

An object therefore of the present invention is to provide an improved apparatus for use in mounting and removing car wheels and hub caps and to provide means for lifting wheels back upon the bolts or studs of the car wheels or rims, and to provide ease in accomplishing these results.

A further object and feature of the invention is to provide a luminescent or phosphorescent coating of glow paint on the tire tool, such as a piece of glare tape for providing illumination of the presence of the tool when used so that oncoming cars may see an operator using the tool to the advantage of the driver of the oncoming vehicle.

These and other objects and advantages of the invention will become apparent upon full consideration of the following detailed description and accompanying drawings in which:

FIG. 1 is a plan elevation view of the tire tool showing the several component features of the present invention according to its preferred embodiment;

FIG. 2 is a cross-sectional view taken along lines 2—2 of FIG. 1; and

FIG. 3 is a generally perspective view of the tire tool shown in FIG. 1.

Referring now to the drawings, there is shown a tire tool 10 having a cross bar forming a cross wrench with arms 12, 14 with a handle 16 at one end of the arm 12 and a wrench element 18 at the other end thereof, and in which the other arm 14 includes a wrench element 20 at one end while at the other end there is a hook means or skid and hook element 24. Mounted and disposed intermediate the hook element 24 and the adjacent end 26 of the arm 14 is a pair of rollers 28 for sliding or rolling around when a tire 30, as shown in FIG. 2, is mounted or held thereon.

Mounted along intermediate portions of the arm 12 on each side of the cross member or arm 14 are short lengths of bars or crosspieces 32, 34 and in which they are spaced for holding a tire 30 thereon, as illustrated in FIG. 2. The crosspieces are spaced apart sufficiently to span the width dimension of a tire, as shown in FIG. 2. In other words, the distance between members 32 and 34 is that of the width of a tire and amounts to about 6 inches.

The member 24 is used to slide along and under the tire, and it is also seen that the hook member 24 also skids along under the peripheral edge of a hub cap and in which the member is used to pry loose the hub cap from the wheel frame or rim forming the tire 30.

Additional embodiments of the invention in this specification will occur to others and therefore it is intended that the scope of the invention be limited only by the appended claim and not by the embodiment described hereinabove. Accordingly, reference should be made to the following claim in determining the full scope of the invention.

What is claimed is:

1. A tire tool comprising a cross wrench with two perpendicularly arranged longitudinal components connected to each other, one of the components having a wrench element on one end thereof, the other component having a combination hub cap remover and tire positioner on one end thereof and a wrench element on the other, a tire support secured to said one component for supporting the tire in a manner so that the side of the tire is always parallel with the longitudinal axis of said other component, said combination allowing the tire to be moved along the ground in a direction transverse with said one component and allowing said support to be lifted for simultaneous horizontal and vertical positioning of the tire within a vertical plane of movement coinciding with said transverse direction, said tire support comprising two rods equally spaced from and parallel to said other component and attached to said one component on opposite sides of said other component, said combination including a hook formed at the end of said other component and rollers rotatably mounted adjacent said hook the distance between the bottommost curved portion of said hook and said longitudinal axis being slightly less than the radius of said rollers.

References Cited

UNITED STATES PATENTS 2,207,443  7/1940  Schneider _____ 254—131
2,504,345  4/1950  Nellis _____ 254—131

FOREIGN PATENTS 779,150  7/1957  Great Britain _____ 7—1G₃
912,800  6/1954  Germany _____ 7—1G₃

ROBERT C. RIORDON, Primary Examiner

R. V. PARKER, Jr., Assistant Examiner

U.S. Cl. X.R.

81—177; 214—332